United States Patent [19]

Hatfield et al.

[11] Patent Number: 5,024,807

[45] Date of Patent: Jun. 18, 1991

[54] DEBRIS CATCHING SPRING DETENT SPACER GRID

[75] Inventors: Stephen C. Hatfield, Granby; Mena G. Andrews, Newington; Richard P. Broders, North Granby, all of Conn.

[73] Assignee: Combustion Engineering, Inc., Windsor, Conn.

[21] Appl. No.: 279,687

[22] Filed: Dec. 5, 1988

[51] Int. Cl.$^5$ .................... G21C 3/10; G21C 19/30
[52] U.S. Cl. .................................. 376/352; 376/313; 376/440; 376/442
[58] Field of Search ............... 376/352, 442, 437, 440, 376/313

[56] References Cited

U.S. PATENT DOCUMENTS

| | | | |
|---|---|---|---|
| 4,125,435 | 11/1978 | Jabsen | 376/442 |
| 4,297,171 | 10/1981 | Olsson | 376/440 |
| 4,391,771 | 7/1983 | Anthony | 376/440 |
| 4,426,355 | 1/1984 | Burger | 376/442 |
| 4,652,425 | 3/1987 | Ferrari et al. | 376/352 |
| 4,684,495 | 8/1987 | Wilson et al. | 376/352 |
| 4,684,496 | 8/1987 | Wilson et al. | 376/352 |
| 4,692,302 | 9/1987 | DeMario et al. | 376/442 |
| 4,781,884 | 11/1988 | Anthony | 376/352 |
| 4,792,428 | 12/1988 | Canat et al. | 376/440 |
| 4,849,161 | 7/1989 | Brown et al. | 376/442 |

Primary Examiner—Harvey E. Behrend
Attorney, Agent, or Firm—John H. Mulholland

[57] ABSTRACT

A fuel assembly has a spring detent spacer grid of intersecting strips for capturing and retaining deleterious debris carried by reactor coolant before it enters the active region of a fuel assembly. A plurality of fuel end caps are peripherally grooved to receive springs projecting from the strips. The end caps are thus captured by springs and debris is wedged and trapped on opposite sides of the strip and against the end caps by pairs of adjacent integral leaves projecting from the stips intermediate and substantially symmetrically arranged about their intersections.

6 Claims, 8 Drawing Sheets

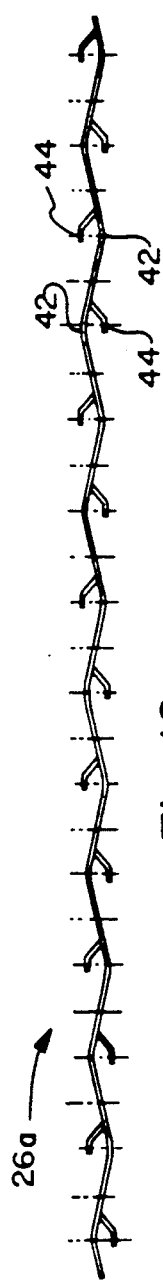
Fig. 10
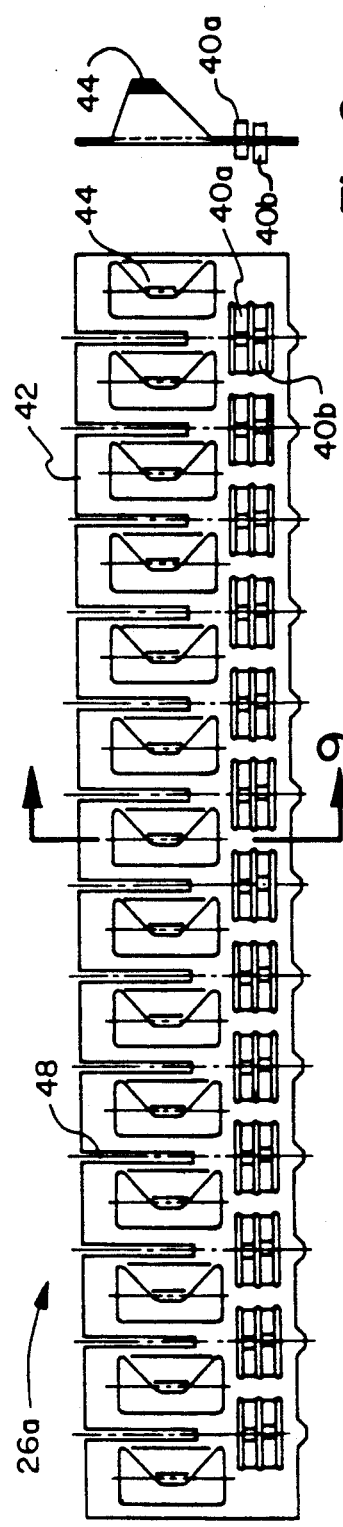
Fig. 8
Fig. 9
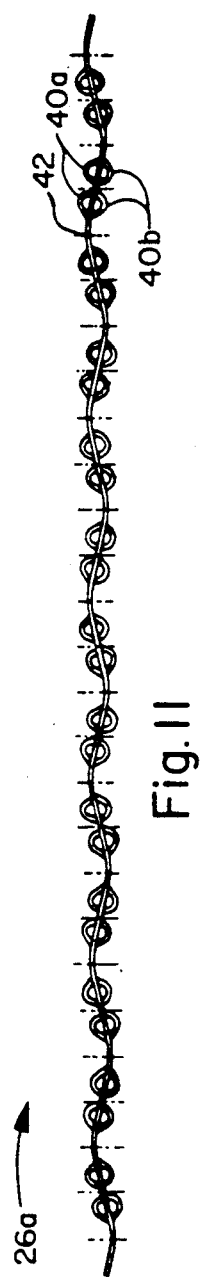
Fig. 11

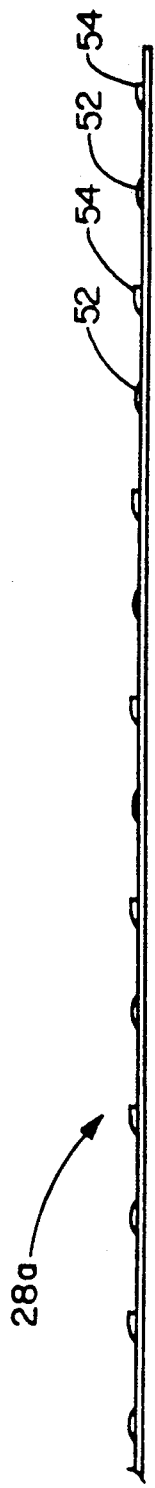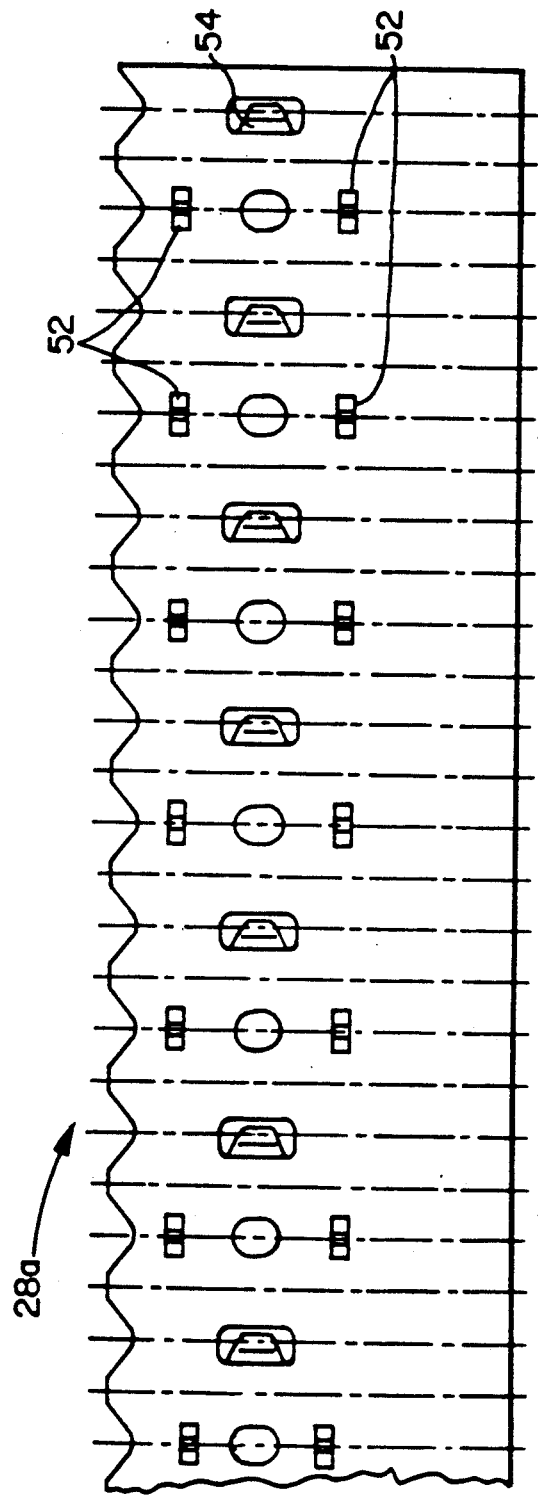

DEBRIS CATCHING SPRING DETENT SPACER GRID

FIELD OF THE INVENTION

This invention relates to nuclear reactor fuel assemblies and in particular those assemblies which include spaced fuel rod support grids mounted in a reactor core as a unit. The fuel rods are held between an upper end fitting and a lower end fitting by means of spacer grids. The reactor coolant flows upwardly from holes in the lower end fitting along the fuel rod lower end caps and upwardly along the fuel rod cladding and through the spacer grids of the fuel assembly.

BACKGROUND OF THE INVENTION

Metallic debris in the coolant which collects or is trapped in fuel rod spacer grids adjacent the fuel containing cladding of the active region is believed responsible for a significant percentage of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable. In fact, metal fragments which can only be picked up with tweezers have been known to "drill" a hole in fuel rod cladding adjacent to a grid in less than 1,000 hours in a test simulating reactor operation. Since most cladding failures in reactors due to debris have occurred either within or below the lowermost spacer grid, a conventional grid apparently provides a rather effective screen for collecting debris. In order to prevent damage in the active area of the reactor, applicant set out to design an improved spacer grid structure for straining debris which: has a good probability of filtering out particles that could cause cladding damage; does not significantly increase fuel assembly uplift; will not jeopardize fuel rod support; will not hinder fuel assembly reconstitutability; will not significantly compromise fuel performance; has high mechanical integrity; is cost effective considering the risk/benefit; will not significantly infringe fuel rod plenum volume; and, does not require unplanned out-of-reactor flow testing. An earlier debris catching grid of Combustion Engineering, Inc., the assignee of the instant invention, was issued as U.S. Pat. No. 4,781,884 on Nov. 1, 1988. That invention was a separate debris catching strainer grid with no rod support function.

A more traditional and prior art Combustion Engineering, Inc. design of fuel assembly (FIG. 1) has sustained a known distribution of debris-induced failures which shows clearly that the lowest spacer grid represents a very effective filter for debris. Unfortunately, the short lower end cap on the fuel rod of that fuel assembly ensures that the hollow cladding tube is adjacent to the trapped debris, and that any flow-induced motion of the debris can wear through the thin wall of the tube and create a failed rod. Based on available knowledge, conventional fuel from all vendors has experienced about the same distribution relationship between failures near the bottom of the assembly and those higher up.

In the traditional or prior art fuel assembly, the lowest spacer grid is some distance up from the bottom of the fuel rod, since, in the absence of a positive axial capture device for the rod, the grid needs to be located at an elevation where it will always laterally capture a "lifted" rod. Rods could potentially lift in response to coolant flow (FIG. 2) during abnormal conditions.

Taking into account the known distribution of debris-induced failures mentioned above, one choice for a debris-resistant fuel assembly design is one in which the solid end cap is merely lengthened such that it extends up through the bottom spacer grid. This simplistic solution, however, has several drawbacks, as follows:

a. zirconium alloy bar stock used for end caps is very expensive and, therefore, there is a strong incentive to minimize end cap length; and b. void volume within the fuel rod and/or the active fuel length will be affected negatively.

SUMMARY OF THE INVENTION

The present invention is an "egg crate" type spacer grid which is the lowermost spacer grid adjacent the lower end fitting. The grid is made up of "wavy" strips which provide bends or arched portions to cooperate with springs to provide support and positive capture for the fuel rods with a minimum of pressure drop across the grid.

The solution provided by the "spring detent spacer grid" of the instant invention is to move the grid down, to thereby reduce the solid zirconium alloy material length required. To preclude the condition depicted in FIG. 2, the grid includes the provision of a fuel rod capturing spring detent device. This spring device engages a circumferential groove with tapered sides in the fuel rod end cap which creates enough axial restraint to prevent or minimize "rod lift" under all flow conditions, but not enough restraint to significantly affect fuel rod reconstitution.

In addition, to further reduce the amount of potentially harmful debris passing by the first spacer grid (which typically has flow areas the same size as those of the spacer grids at higher elevations), integral leaves substantially symmetrically arranged on either side of the strip intersections have been added to greatly increase the likelihood that debris that passes the novel first or bottom "spring detent spacer grid" is too small to become trapped at a higher grid where it can damage the cladding of the active fuel region. The particular advantages of this spacer grid over other debris-catching concepts are:

a. Compared to a separate screen-type grid: there is no cost of an extra component and there is a much lower incremental increase in pressure drop;

b. Compared to a lower end fitting type filter (e.g., small holes in casting or integral screen): tests showed that with the spacer grid-type device there is a large amount of retained debris (probably because of tapered surfaces into which debris becomes "wedged") when the coolant flow is turned off, instead of with the other devices allowing debris to drop back into the region below the core for multiple attacks and chances to get through to the cladding. Tests also showed that the turbulence present in the region just below the lower end fitting caused the debris in many cases to "bounce" along the lower surface of the lower end fitting type filters and to eventually move over to the edge where it could pass up the gap between the fuel assemblies to get caught in a higher grid. With the "spring detent spacer grid", the debris passes through large lower end fitting holes, hits the grid edges, and even if it does not immediately become wedged, it is blocked from escaping into the assembly-to-assembly gap by the perimeter strip.

c. Compared to a long end cap and conventional grid: there is less cost and less negative impact on stack length or rod void volume.

BRIEF DESCRIPTION OF THE DRAWINGS

FIG. 8 is an elevational view of the bottom strip of the novel "spring detent spacer grid";

FIG. 9 is a cross-sectional view taken along the line 9—9 of FIG. 8;

FIG. 10 is a plan view of the strip of FIG. 8, where the debris-catching features have been deleted for clarity;

FIG. 11 is a bottom view of the strip of FIG. 8, where just the debris-catching features are shown;

FIG. 12 is an elevational view of a typical perimeter strip of the type used on the novel "spring detent spacer grid";

FIG. 13 is a plan view of the strip of FIG. 12;

DETAILED DESCRIPTION OF THE PREFERRED EMBODIMENT

Figure 1:
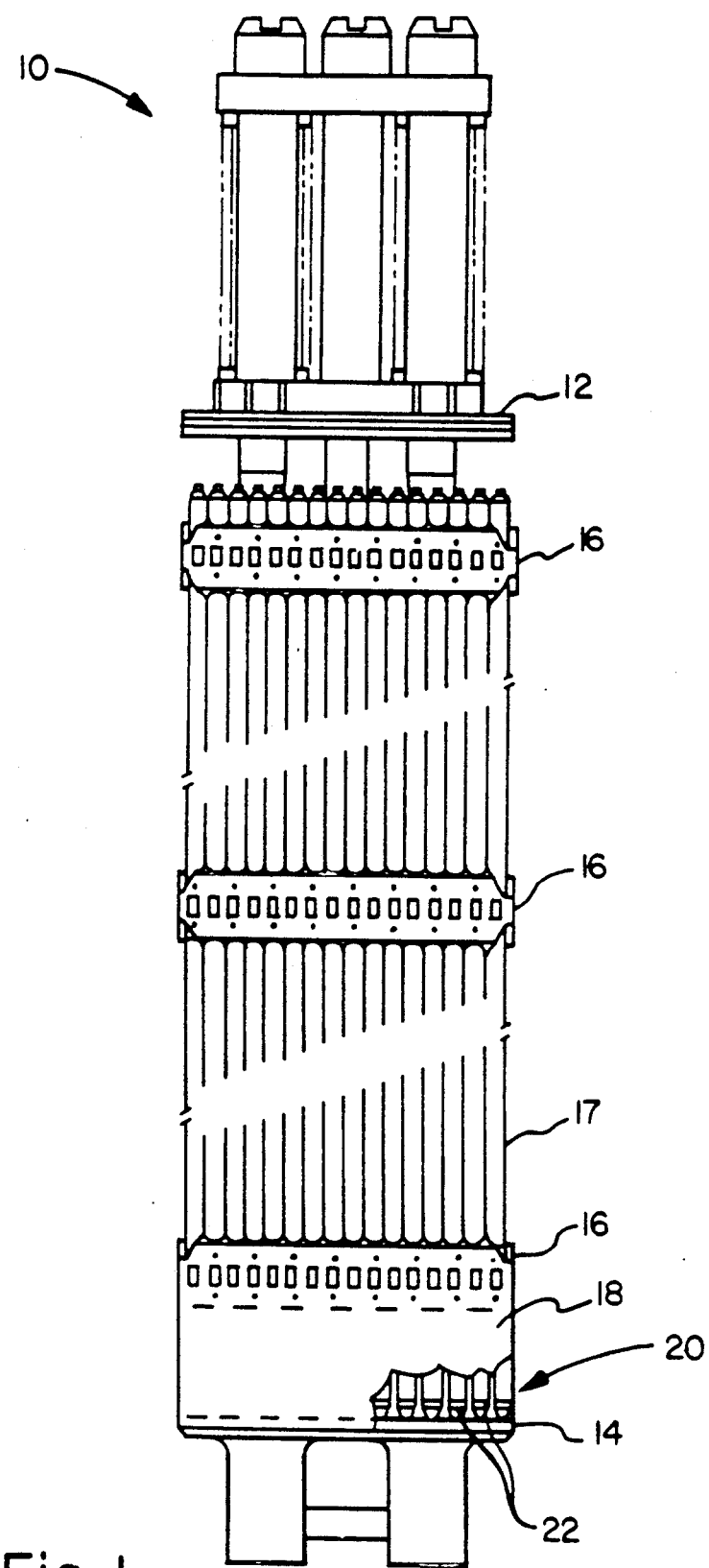
FIG. 1 is a schematic elevational view of a conventional prior art fuel assembly with broken portions for clarity.
Figure 2:
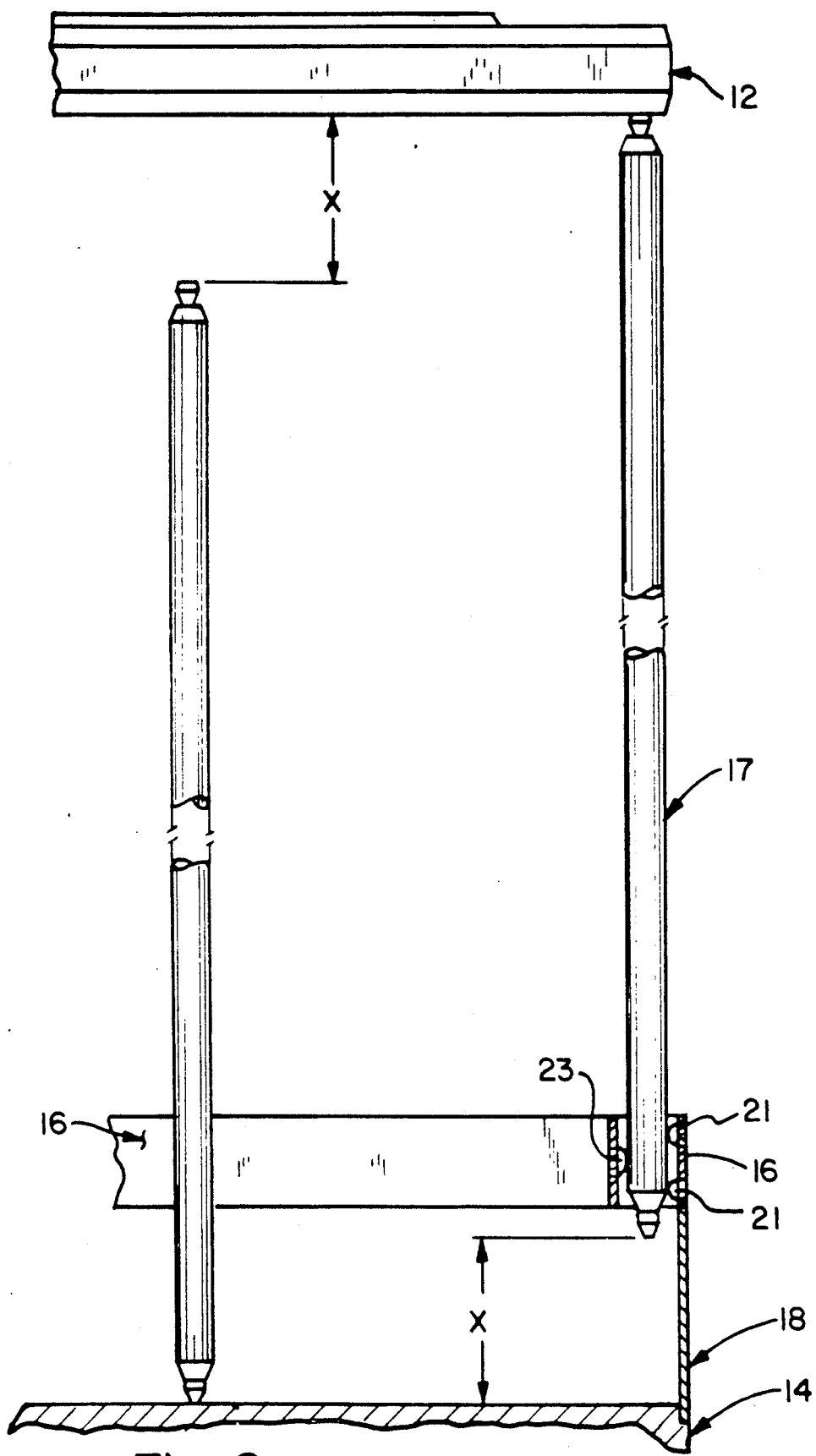
FIG. 2 is a schematic elevational view illustrating "rod lift" and "shoulder gap" in the prior art fuel assembly of FIG. 1.

To understand the preferred embodiment, it is helpful to first refer to prior art FIGS. 1 and 2 where the numeral 10 generally designates a conventional fuel assembly. In FIG. 1, the prior art fuel assembly 10 includes an upper end fitting 12, a lower end fitting 14, spacer grids 16 supporting fuel rods 17, and a perimeter skirt portion 18 shown partially broken away in FIG. 1. In a conventional assembly, the region enclosed by the skirt would contain only the fuel rods.

The numeral 20 indicates the location for a debris catching strainer grid constructed according to principles of the prior art (U.S. Pat. No. 4,781,884). Behind the skirt 18, within the non-end-cap-contacting compartments defined by the debris catching strainer grid 20 and at the ends of fuel rods 17, are solid fuel rod end caps 22. Each fuel rod end cap 22 is in a non-end-cap-contacting compartment of the prior art strainer grid 20.

In FIG. 2 the perimeter skirt portion 18 and lower grid portion 16 is in cross-section to show how spring 23 and at least one arch 21 remain in position for capture of fuel rod 17, in spite of the "rod lift" caused by abnormal coolant flow in an amount equal to the length "x" of the "shoulder gap".

Figure 3:
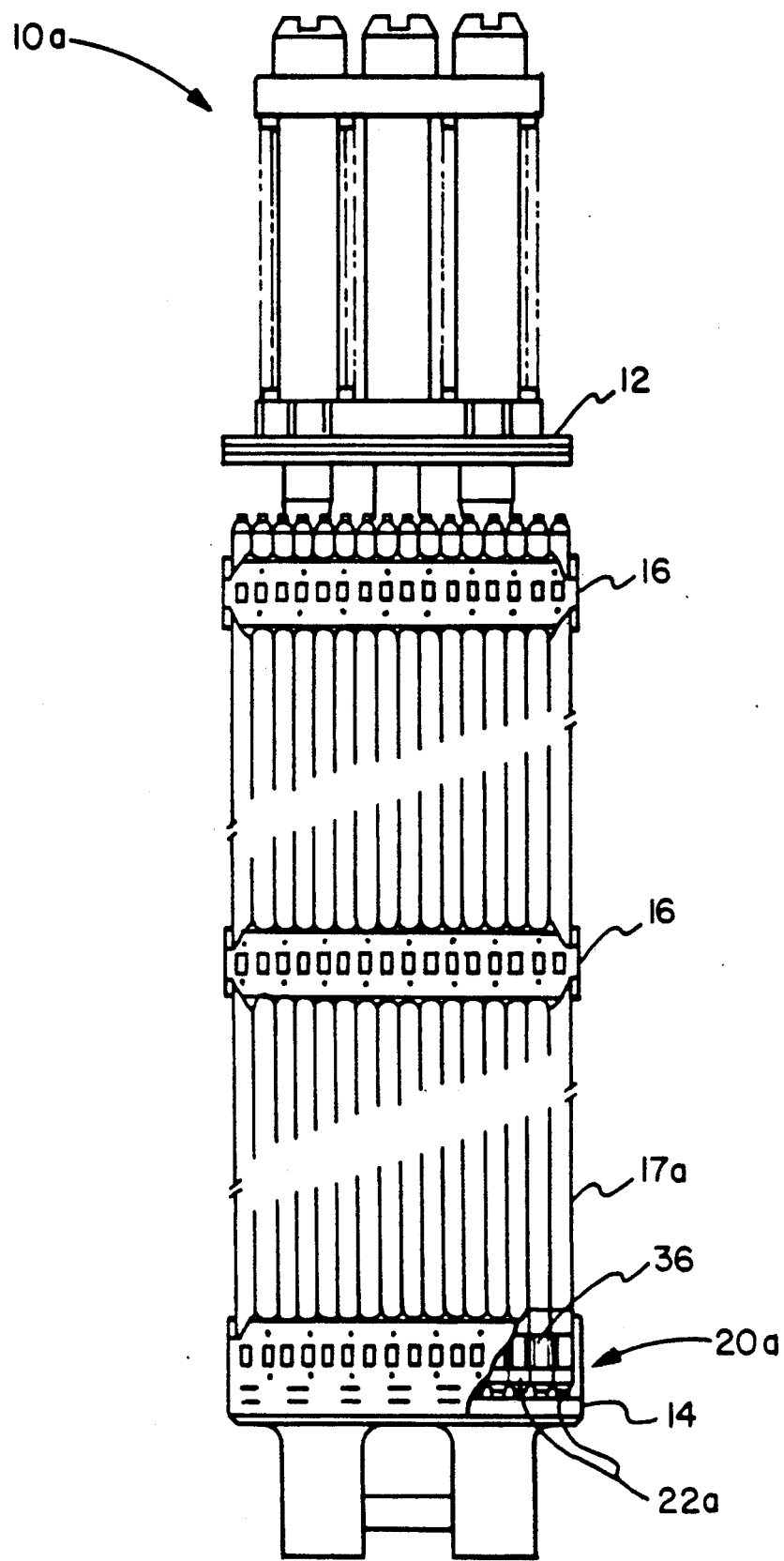
FIG. 3 is a schematic elevational view illustrating a fuel assembly of the invention including the grooved end caps and the novel "spring detent spacer grid" for trapping debris.
Figure 6:
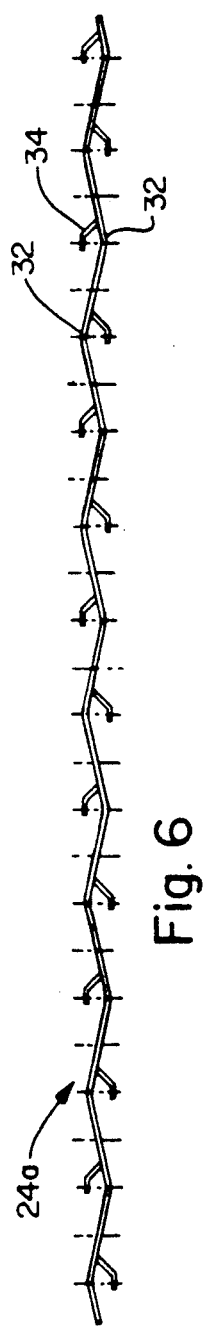
FIG. 6 is a plan view of the strip of FIG. 4, where the debris-catching features have been deleted for clarity.
Figure 4:
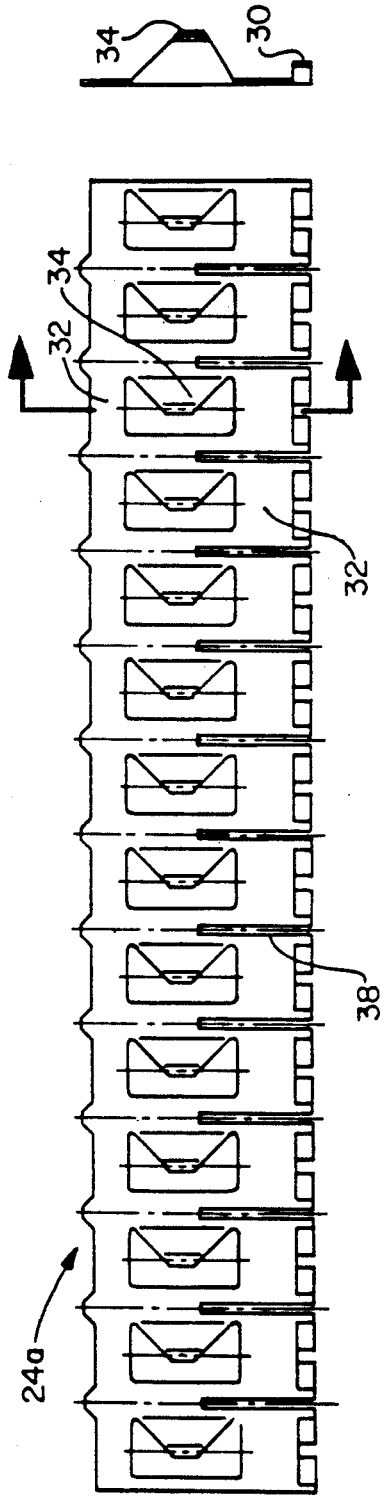
FIG. 4 is an elevational view of the top strip of the novel "spring detent spacer grid"
Figure 5:
FIG. 5 is a cross-sectional view taken along the line 5—5 of FIG. 4.
Figure 7:
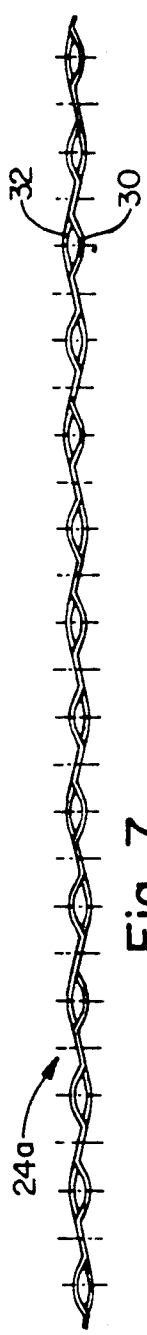
FIG. 7 is a bottom view of the strip of FIG. 4, where just the debris-catching features are shown.
Figure 14:
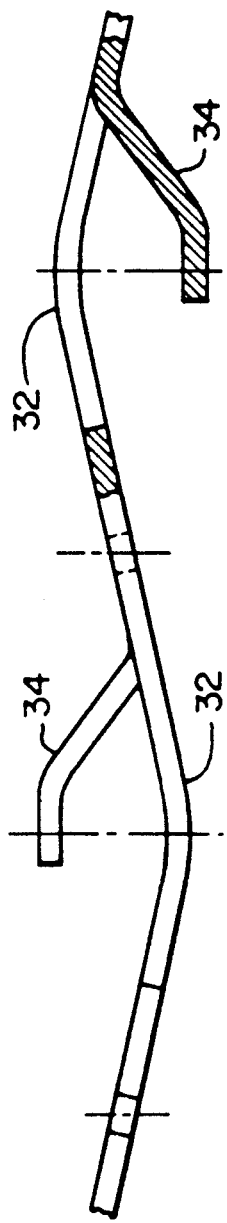
FIG. 14 is an enlarged portion of FIGS. 6 and 10.
Figure 15:
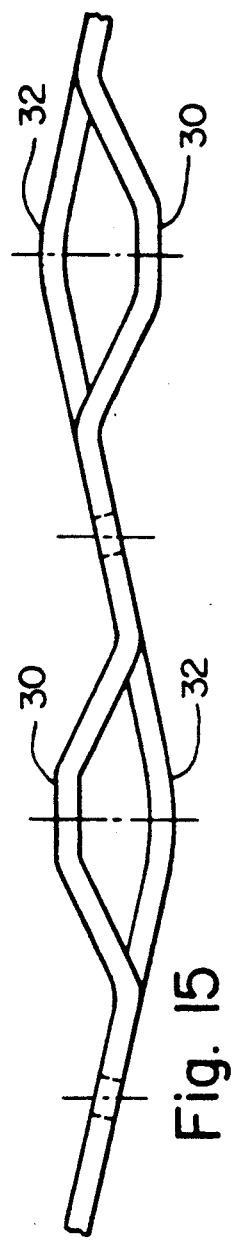
FIG. 15 is an enlarged portion of FIG. 7.
Figure 16:
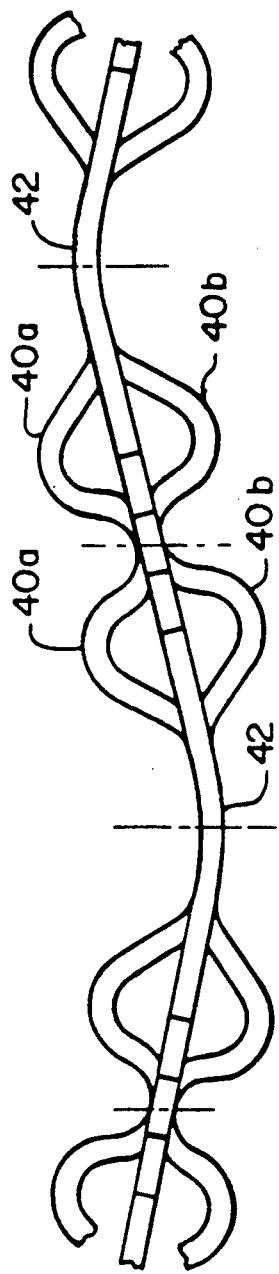
FIG. 16 is an enlarged portion of FIG. 11.

The novel "spring detent spacer grid" of FIG. 3 is generally designated 20a and cooperates with circumferentially grooved end caps 22a with which it is in contact for "rod lift" preventing rod capture, for debris trapping and for debris retention below the active region or cladding of the fuel even with the coolant pumps off. The fuel assembly of FIG. 3 with "spring detent spacer grid" 20a is designated 10a, for convenience. Parts in fuel assembly 10a which are substantially the same as parts in prior art assembly 10 carry the same numbers in FIGS. 3 to 18 as they have in FIGS. 1 and 2. The new parts which are used to make up new fuel assembly 10a with the novel "spring detent spacer grid" 20a of the invention are given part numbers with letter subscripts.

FIGS. 4 to 16 show the details of the strips utilized in making up the embodiment of the "spring detent spacer grid" 20a. The strips 24a are the top strips of the "eggcrate" grid assembly. Strips 26a are the bottom strips and strips 28a are the perimeter strips.

As seen in FIGS. 4 to 7, the top strips 24a have leaves 30, opposite arch portions or bends 32 and extending in the same direction as the springs 34 which seat in tapered sided circumferential grooves 36 of end caps 22a to provide "rod lift" preventing rod capture. The bends or arch portions 32 cooperate with the springs 34 to laterally hold the fuel rods 17a, in known manner. Slots 38 facilitate the "eggcrate" assembly.

As seen in FIGS. 8 to 11 the bottom strips 26a have leaves 40a and 40b vertically displaced on opposite sides of the strip but located such that they will be substantially symmetrically located relative to the intersection of strips 24a and 26a when assembled into a grid. Bends or arched portions 42 and springs 44 cooperate with end caps 22a and grooves 36 in the same manner as do portions 32 and springs 34. Slots accommodate the "eggcrate" assembly.

The perimeter strip 28a illustrated in FIGS. 12 and is one typical type, but other designs are contemplated. The leaves 52 provide the arch function and the springs 54 engage the grooves 36 in end caps 22a. The perimeter strip 28a is straight without bends of the type at 32 and 42.

Figure 17:
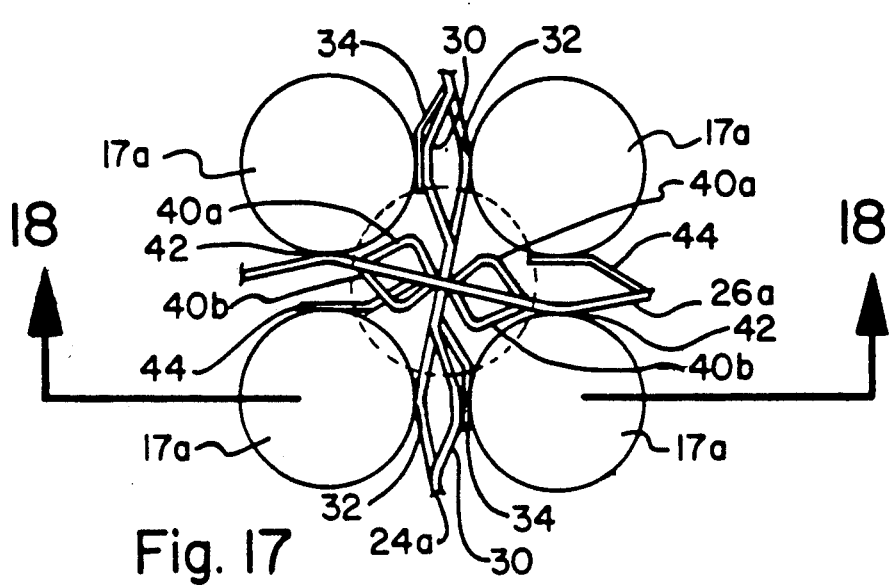
FIG. 17 is a schematic cross-section of the area of intersection of two strips of the novel "spring detent spacer grid"
Figure 18:
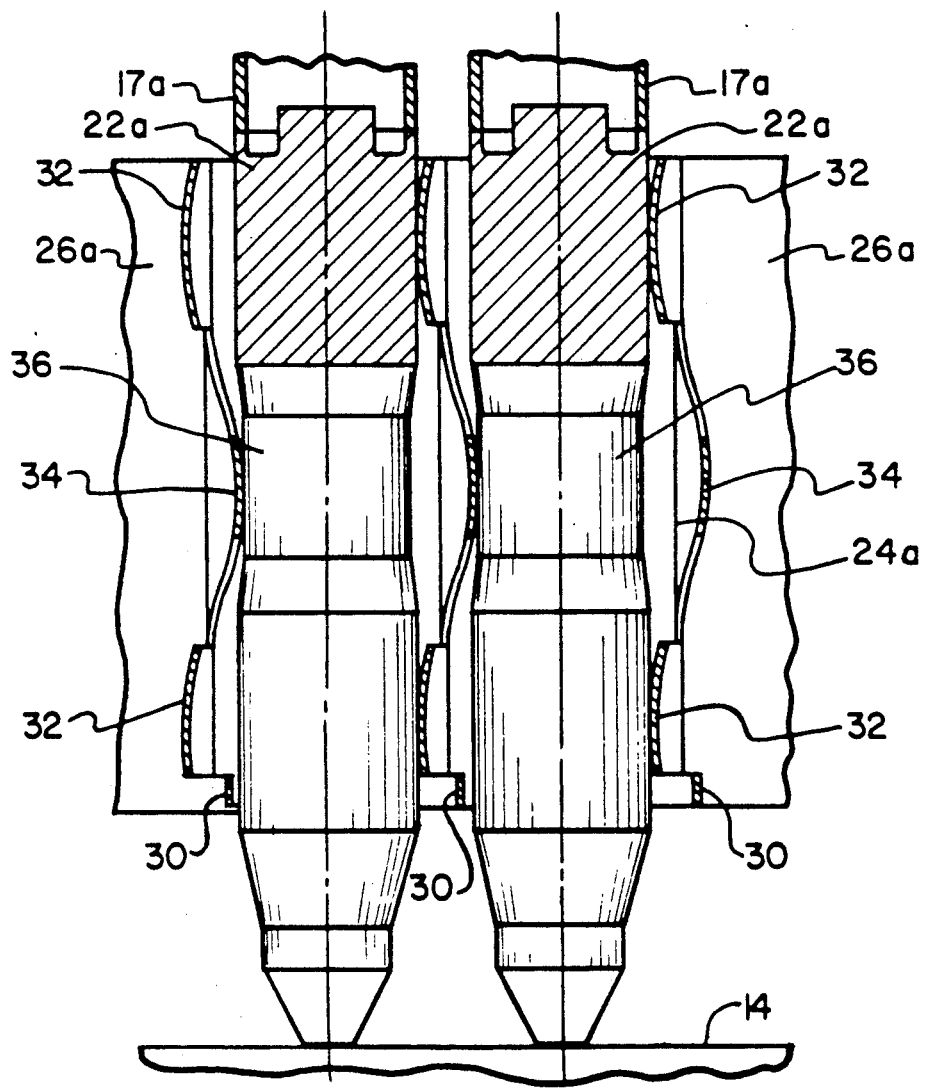
FIG. 18 is a cross-section taken along line 18—18 of FIG. 17.

FIGS. 17 and 18 show the relation of symmetry and the relative elevation of the features of the new "spring detent spacer grid". From these figures it is easy to see why debris is trapped and retained in the various tapered passageways the instant invention creates in the area just above the lower end fitting 14.

We claim:

1. In a nuclear reactor having fuel assemblies including an upper end fitting and a lower end fitting and spaced nuclear fuel rod spacer grids therebetween for supporting and spacing a plurality of elongated nuclear fuel rods, each of which includes a hollow active portion of nuclear fuel filled cladding intermediate the rod ends and a tapering end cap of solid material with a circumferential groove on the rod end which first encounters reactor coolant flow, a tall spacer grid relative to the grids adjacent the active portion being means for capturing and retaining deleterious debris carried by reactor coolant before it enters the active region of a fuel assembly through solid end caps compartments' corners and creates fuel rod cladding damage, comprising in combination:
- a polygonal perimeter,
- a plurality of fuel end cap compartments defined by pairs of first and second intersection and slottedly interlocked grid-forming strips attached to said perimeter and to each other,
- fuel rod end caps each extending into a respective one of said end cap compartments,
- at least some of said end cap compartments defined by two pairs of intersecting and slottedly interlocked strips which include integral springs for contact with said end caps in said circumferential grooves and for cooperation with opposing arched portions of said strips also in contact with said end caps,
- leaves projecting out of said strips intermediate their intersections, each of said leaves being spaced from the fuel rod end caps and extending into the solid end caps compartments' corners and
- each of said leaves being means for enhancing the spacer grid's ability to capture and retain debris in the regions of said solid end caps compartments' corners so that before said debris passing into said regions engages the active portion of the fuel rods it is captures.

2. The spacer grid of claim 1 in which the arched portions of said strips are formed by the bends of the strips which make the strips have a wavy structure.

3. The spacer grid of claim 2 in which the arched portions of said strips contact said end caps above and below but not in said circumferential grooves.

4. The spacer grid of claim 1 in which the leaves of the individual strips are substantially symmetrical about the slotted intersections when the slottedly interlocked strips are viewed edgewise in the direction of coolant flow.

5. The spacer grid of claim 1 in which the circumferential grooves include tapered surfaces to assist in rod insertion and removal.

6. The spacer grid of claim 1 in which the springs include curved surfaces to assist in rod insertion and removal.

* * * * *